United States Patent [19]

Mayer

[11] Patent Number: 5,226,294
[45] Date of Patent: Jul. 13, 1993

[54] COMPRESSOR ARRANGEMENT SUITABLE FOR TRANSPORT REFRIGERATION SYSTEMS

[75] Inventor: Donald K. Mayer, Bloomington, Minn.

[73] Assignee: Thermo King Corporation, Minneapolis, Minn.

[21] Appl. No.: 874,948

[22] Filed: Apr. 28, 1992

[51] Int. Cl.$^5$ ............................................. F25B 27/00
[52] U.S. Cl. ............................. 62/323.1; 62/323.3; 62/236; 62/239
[58] Field of Search .................... 62/323.1, 323.3, 236, 62/239, 241

[56] References Cited

U.S. PATENT DOCUMENTS

| | | | |
|---|---|---|---|
| 2,467,398 | 4/1949 | Miller | 62/236 |
| 3,606,752 | 9/1972 | Shaw | 62/236 |
| 3,998,501 | 12/1976 | Cyphelly | 308/9 |
| 4,421,658 | 12/1983 | Reick | 252/32.7 |
| 4,477,233 | 10/1984 | Schaefer | 417/366 |
| 4,531,379 | 7/1985 | Diefenthaler | 62/236 |
| 4,544,334 | 10/1985 | Ellis | 417/360 |
| 4,547,131 | 10/1985 | Riffe et al. | 417/53 |
| 4,584,750 | 4/1986 | Ozu et al. | 29/156.4 R |
| 5,046,326 | 9/1991 | Havemann et al. | 62/180 |

Primary Examiner—Albert J. Makay
Assistant Examiner—William C. Doerrler
Attorney, Agent, or Firm—M. J. Moran

[57] ABSTRACT

A refrigerant compressor system suitable for transport refrigeration applications, including a refrigerant compressor, an electric motor and a hydraulic motor directly coupled together within a common housing. The electric motor includes a stator and a rotor, with the rotor having first and second axial ends. The refrigerant compressor is coupled to the first axial end of rotor, and the hydraulic motor is coupled to the second axial end. A single housing surrounds the electric motor, the refrigerant compressor, and the hydraulic motor. Hydraulic fluid for driving the hydraulic motor is selected to be compatible with the lubricating oil of the refrigerant compressor, such that leakage of hydraulic fluid into the housing will not adversely affect operation of the refrigerant compressor system. The housing is directly connected to a selected side of an associated refrigeration system, with the suction side being preferred, enabling the housing to also function as a refrigerant accumulator.

9 Claims, 1 Drawing Sheet

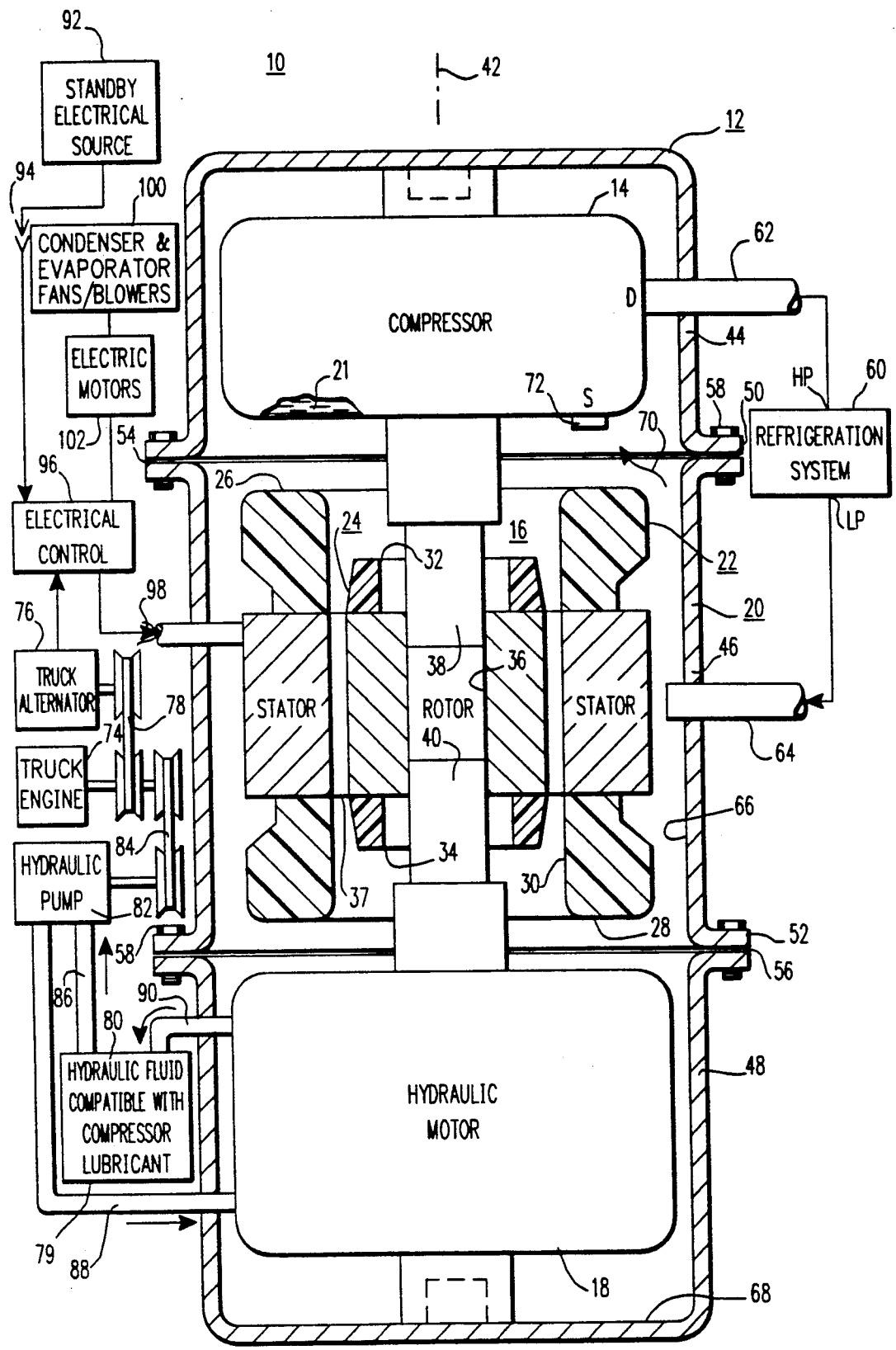

COMPRESSOR ARRANGEMENT SUITABLE FOR TRANSPORT REFRIGERATION SYSTEMS

TECHNICAL FIELD

The invention relates in general to refrigeration compressors, and more specifically to a refrigerant compressor construction and drive arrangement suitable for transport refrigeration systems, such as for straight trucks, and the like.

BACKGROUND ART

Hydraulic driven refrigeration systems have been used in straight trucks, with such systems usually comprising an open compressor which is selectively belt driven by either a hydraulic motor or an electric motor. When the truck engine is operating, the truck engine drives a hydraulic pump which drives the hydraulic motor. When the truck engine is not operating, the compressor may be driven by connecting the electric motor to commercial utility power.

Truck refrigeration systems have also utilized an electrically driven compressor in which a direct shaft coupled rotary compressor and electric motor are hermetically enclosed in a common housing.

It would be desirable, and it is an object of the present invention, to provide a new and improved refrigeration system suitable for transport refrigeration applications, having a compressor which is selectively capable of being driven hydraulically or electrically.

SUMMARY OF THE INVENTION

Briefly, the present invention is a refrigerant compressor system suitable for transport refrigeration applications which includes an electric motor having a stator and rotor, with the rotor having first and second axial ends. A refrigerant compressor is coupled to the first axial end of the rotor, and a hydraulic motor is coupled to the second axial end of the rotor, with the compressor and hydraulic motor providing the sole support for the rotor. Thus, the electric motor is devoid of separate bearings, shaft, housing and end bells.

A single housing surrounds the electric motor, the refrigerant compressor, and the hydraulic motor. The single housing, in a preferred embodiment of the invention, includes at least first and second housing parts joined by a sealed flange joint which is openable for maintenance purposes. The housing is also preferably directly connected to either the high or low pressure side of the associated transport refrigeration system, with the low pressure or suction side being preferred. The low pressure side is preferred as the low temperature suction gas will cool the electric motor while it is operative, and the housing will provide the additional function of acting as a refrigerant accumulator.

Hydraulic fluid for driving the hydraulic motor is selected to be compatible with the lubricating oil of the refrigerant compressor, and in a preferred embodiment of the invention, the hydraulic fluid and lubricating oil are identical. Therefore, a hydraulic leak from the hydraulic motor shaft seal within the common housing will not adversely affect operation of the compressor system.

In another embodiment of the invention, condenser and evaporator blowers or fans of the associated transport refrigeration system are driven by electric motors, with the electric motor of the compressor drive arrangement functioning as an induction alternator to provide electrical power for the fan and/or blower motors while the hydraulic motor is driving the refrigerant compressor.

BRIEF DESCRIPTION OF THE DRAWINGS

The invention will become more apparent by reading the following detailed description in conjunction with the drawing, which is shown by way of example only, wherein the single Figure illustrates a refrigerant compressor and associated drive arrangement constructed according to the teachings of the invention, and connected in a transport refrigeration application.

DESCRIPTION OF PREFERRED EMBODIMENTS

Referring now to the drawings, the single Figure illustrates a transport refrigeration system 10 having a refrigerant compressor system 12 constructed according to the teachings of the invention. Compressor system 12 is shown in partial vertical section, with the remaining portions of transport refrigeration system 10 being set forth diagrammatically in block and schematic form, as they are well known in the art.

Compressor system 12 includes a compressor 14, an electric motor 16, and a hydraulic motor 18, all disposed within a single hermetically sealed housing 20. Compressor 14, which has discharge and suction sides D and S, respectively, is preferably of the rotary type, such as a compressor of the scroll, vane, rolling piston, or screw type, as a rotary compressor has a cylindrical profile which is more suitable for a hermetic type housing than a reciprocating compressor. However, any type of compressor may be used. Compressor 14 includes a lubricating oil 21.

Hydraulic motor 18 may be conventional. The only requirement relative to hydraulic motor 18 is in regard to the selection of the hydraulic fluid used to operate it. For purposes which will become clear as the description proceeds, the hydraulic fluid must be selected to be compatible with the compressor lubricant. Since compressor lubricant will also function as a hydraulic fluid, in a preferred embodiment of the invention, the compressor lubricant and hydraulic fluid for operating hydraulic motor 18 are identical.

Electric motor 16 includes a stator 22 and a rotor 24. Stator 22 has first and second axial ends 26 and 28, respectively, and an axially extending bore 30 which extends between ends 26 and 28.

Rotor 24 has first and second axial ends 32 and 34, respectively, and an opening 36 disposed between ends 32 and 34. Rotor 24 has an outer diameter selected to provide a predetermined air gap 37 when rotor 24 is disposed within stator bore 30 and axially aligned with the longitudinal axis of stator 22. Stator 22 is suitably fixed within housing 20. While rotor 24 may have a rotor shaft disposed within rotor opening 36, which would require couplings at the ends of the rotor shaft, in a preferred embodiment of the invention a separate rotor shaft and associated couplings are not required. Compressor 14 and hydraulic motor 18 have input and output shafts 38 and 40, respectively, which are suitably journaled in support bearings, and rotor 24 is disposed to function as a coupling between the output shaft 40 of hydraulic motor 18 and the input shaft 38 of compressor 14.

More specifically, shafts 38 and 40 engagingly extend into rotor opening 36 from the first and second axial ends 32 and 34 of rotor 24. Longitudinal axes of rotor 24, compressor 14, hydraulic motor 18 and housing 20 are coaxial with a longitudinal axis 42 of the compressor system 12. Thus, the disclosed construction of compressor system 12, in addition to eliminating belt driven compressor drive components, further eliminates the need for a separate motor housing, motor end bells, rotor shaft and associated support bearings.

While housing 20 is a hermetic housing, the term hermetic housing is usually associated with an all-welded housing construction. In a preferred embodiment of the present invention, housing 20 is constructed of at least first and second housing shells joined together by at least one sealed flange joint which is openable for maintenance purposes. In the exemplary embodiment set forth in the single Figure, first, second, and third housing shells 44, 46 and 48, respectively, are illustrated, joined by first and second flanged joints 50 and 52, respectively. Flanged joints 50 and 52 may include gaskets 54 and 56, respectively, and a plurality of fastener means, such as the bolts 58 illustrated. Since housing 20 is openable for maintenance purposes, it may be referred to as a semi-hermetic housing.

Housing 20 is preferably a functional portion of an associated refrigeration system 60, by constructing housing 20 to be directly connected to either the high pressure side HP or low pressure side LP of refrigeration system 60. In the preferred embodiment set forth in the single Figure, housing 20 is connected directly the low pressure or suction side LP of refrigeration system 60. This has the advantages of enabling electric motor 16 to be cooled by the low temperature suction vapors returning to the compressor 14, and enabling housing 20 to function as a refrigerant accumulator, which eliminates the need for a separate accumulator. As illustrated, a hot gas line 62 extends from the discharge side D of compressor 14 to the high pressure side HP of refrigeration system 60, through a sealed opening in housing 20, and a suction line 64 extends from the low pressure side LP of refrigeration system 60 to housing 20. Thus, suction line 64 discharges refrigerant returning to compressor 14 into the inside 66 of housing 20. If the returning refrigerant includes liquid refrigerant, it will go to the bottom 68 of housing 20, while refrigerant in vapor form, indicated by arrow 70, is drawn into a suction port 72 on the suction side S of compressor 14.

Transport refrigeration system 10 is associated with a vehicle, such as a truck, having an internal combustion truck engine 74 which drives a truck alternator 76 via a pulley and belt arrangement 78. In the present invention, a supply or reservoir 79 of hydraulic fluid 80 identical to, or compatible with, the compressor lubricant 21, is provided, along with a hydraulic pump 82, which is also belt coupled to truck engine 74, with a pulley and belt arrangement 84. When truck engine 74 is operating, it drives hydraulic pump 82, and hydraulic pump 82 withdraws hydraulic fluid 80 from reservoir 79 via a hydraulic line 86 and supplies the hydraulic fluid 80 to hydraulic motor 18 via a hydraulic line 88 which enters housing 20 via a sealed access opening. A hydraulic line 90 returns hydraulic fluid 80 from hydraulic motor 18 to reservoir 79 via a sealed opening in housing 20.

When truck engine 74 is not operating, a standby electrical source 92 may be connected to drive electric motor 16 via a plug-in connector 94, requisite electrical control 96, and electrical motor leads 98, with the latter extending through a sealed opening in housing 20.

While hydraulic motor 18 is operating, it will be driving rotor 24, and thus electric motor 16 may be operated as an induction alternator, such as disclosed in U.S. Pat. No. 3,720,842, which is assigned to the same assignee as the present application. Thus, in a preferred embodiment of the invention, condenser and evaporator fans and/or blowers of refrigeration system 60, shown separately in block form at 100, are driven by electric motors 102 powered by the output of electric motor 16 when functioning as a generator. Electric motors 102 may be powered from standby electrical source 92 when truck engine 74 is not operating. Alternatively, the condenser and evaporator fans/blowers 100 may be operated by hydraulic motors driven in parallel with the compressor motor during truck engine operation. During operation of compressor 14 via electric motor 16, the hydraulic motor 18 will serve as a pump to drive the hydraulic fan/blower motors.

In summary, there has been disclosed a new and improved compressor system 12 suitable for transport refrigeration applications, with the only additional belted component to an associated internal combustion engine 74 being a compact hydraulic pump 82. A compressor 14 with a dual drive, electric and hydraulic, is provided in the form of a single compact compressor system 12 in which a compressor 14, electric motor 16 and hydraulic motor 18 are directly coupled. The electric motor 16 adds little to the cost of the system 12, as items usually associated with an electric motor, such as rotor shaft, bearings, end bells, and motor housing are not required. The rotor 24 functions as a coupling between the output and input shafts 40 and 38, respectively, of hydraulic motor 18 and compressor 14. A single housing 20 surrounds the components of compressor system 12, which is made practical by either using the same oil 21 used as the lubricant for compressor 14 as the hydraulic fluid 80 for operating hydraulic motor 18, or by selecting two different but compatible oils. In another preferred embodiment, cooling of motor 16 is enhanced, and the need for a separate refrigerant accumulator is eliminated, by utilizing the common housing 20 as a refrigerant accumulator, by connecting the low pressure or suction side of refrigeration system 60 directly to housing 20, with housing 20 functioning at suction side pressure.

What is claimed is:

1. A refrigerant compressor system suitable for transport refrigeration applications, comprising:
    an electric motor having a stator and rotor, with the rotor having first and second axial ends,
    a refrigerant compressor coupled to the first axial end of said rotor, with said refrigerant compressor including lubricating oil,
    a hydraulic motor coupled to the second axial end of said rotor,
    hydraulic fluid for driving said hydraulic motor, and
    a single housing surrounding said electric motor, said refrigerant compressor, and said hydraulic motor,
    said single housing being sealed to the atmosphere,
    said hydraulic fluid being compatible with the lubricating oil of said refrigerant compressor, whereby leakage from the hydraulic motor within the single sealed housing will not adversely affect the operation of the refrigerant compressor system.

2. A refrigerant compressor system suitable for transport refrigeration applications, comprising:
    an electric motor having a stator and rotor, with the rotor having first and second axial ends, a refrigerant compressor coupled to the first axial end of said rotor, with said refrigerant compressor including lubricating oil, a hydraulic motor coupled to the second axial end of said rotor, hydraulic fluid for driving said hydraulic motor, and a single housing surrounding said electric motor, said refrigerant compressor, and said hydraulic motor, said hydraulic fluid being compatible with the lubricating oil of said refrigerant compressor, whereby leakage from the hydraulic motor within the housing will not adversely affect the operation of the refrigerant compressor system, said electric motor being devoid of separate support bearings, with the refrigerant compressor and the hydraulic motor providing the sole support for the rotor of the electric motor.

3. A refrigerant compressor system suitable for transport refrigeration applications, comprising:

an electric motor having a stator and rotor, with the rotor having first and second axial ends, a refrigerant compressor coupled to the first axial end of said rotor, with said refrigerant compressor including lubricating oil, a hydraulic motor coupled to the second axial end of said rotor, hydraulic fluid for driving said hydraulic motor, a single housing surrounding said electric motor, said refrigerant compressor, and said hydraulic motor, said hydraulic fluid being compatible with the lubricating oil of said refrigerant compressor, whereby leakage from the hydraulic motor within the housing will not adversely affect the operation of the refrigerant compressor system, and a refrigeration system having high pressure and low pressure sides, said housing being sealed to the atmosphere and directly connected to a selected side of the refrigeration system.

4. The refrigerant compressor system of claim 3 wherein the housing is directly connected to low pressure side of the refrigeration system, with the housing functioning as a refrigerant accumulator for the compressor.

5. The refrigerant compressor system of claim 1 wherein the lubricating oil for the refrigerant compressor and the hydraulic fluid for the hydraulic motor are identical.

6. A refrigerant compressor system suitable for transport refrigeration applications, comprising:

an electric motor having a stator and rotor, with the rotor having first and second axial ends, a refrigerant compressor coupled to the first axial end of said rotor, with said refrigerant compressor including lubricating oil, a hydraulic motor coupled to the second axial end of said rotor, hydraulic fluid for driving said hydraulic motor, and a single housing surrounding said electric motor, said refrigerant compressor, and said hydraulic motor, said hydraulic fluid being compatible with the lubricating oil of said refrigerant compressor, whereby leakage from the hydraulic motor within the housing will not adversely affect the operation of the refrigerant compressor system, said housing including at least first and second housing parts joined by a sealed flange joint which is openable for maintenance purposes.

7. The refrigerant compressor system of claim 1 including an internal combustion engine coupled to a hydraulic pump, with said hydraulic pump providing the hydraulic fluid for driving the hydraulic motor while the engine is operating.

8. The refrigerant compressor system of claim 1 wherein the refrigerant compressor is a rotary compressor.

9. A refrigerant compressor system suitable for transport refrigeration applications, comprising:

an electric motor having a stator and rotor, with the rotor having first and second axial ends, a refrigerant compressor coupled to the first axial end of said rotor, with said refrigerant compressor including lubricating oil, a hydraulic motor coupled to the second axial end of said rotor, hydraulic fluid for driving said hydraulic motor, a single housing surrounding said electric motor, said refrigerant compressor, and said hydraulic motor, said hydraulic fluid being compatible with the lubricating oil of said refrigerant compressor, whereby leakage from the hydraulic motor within the housing will not adversely affect the operation of the refrigerant compressor system, said electric motor functioning as an induction alternator while the hydraulic motor is operative, and a refrigeration system connected to the refrigerant compressor, said refrigeration system including electrically driven evaporator and condenser air mover means which receive electrical power from the electric motor while the electric motor is functioning as an induction alternator.

* * * * *